United States Patent [19]

Ozaki

[11] Patent Number: 4,948,226

[45] Date of Patent: Aug. 14, 1990

[54] LENS ALIGNMENT APPARATUS FOR USE IN A PROJECTION TELEVISION

[75] Inventor: Yukio Ozaki, Tokyo, Japan

[73] Assignee: Pioneer Electronic Corporation, Tokyo, Japan

[21] Appl. No.: 313,417

[22] Filed: Feb. 22, 1989

[30] Foreign Application Priority Data

Apr. 6, 1988 [JP] Japan .............................. 63-45662[U]

[51] Int. Cl.⁵ ................................................ G02B 7/02
[52] U.S. Cl. ..................................... 350/245; 350/252; 358/249; 358/250
[58] Field of Search ........................ 350/245, 252, 253; 358/231, 237, 239, 249, 250, 254

[56] References Cited

U.S. PATENT DOCUMENTS 3,048,654  8/1962  Schade, Sr. ......................... 358/249
4,725,755  2/1988  Hasegawa ........................... 358/250

Primary Examiner—Bruce Y. Arnold
Assistant Examiner—Loha Ben
Attorney, Agent, or Firm—Finnegan, Henderson, Farabow, Garrett, and Dunner

[57] ABSTRACT

A lens alignment apparatus for use in a projection television having a fluorescent screen including a tube and a projection tube mounting frame comprises a first lens mounted on the projection tube mounting frame in front of the fluorerscent screen of the tube, a lens frame for receiving the first lens, a plurality of contactors provided on one of the peripheries of the first lens and the lens frame, a plurality of guide members provided on the other of the peripheries of the first lens and the lens frame, the guide members being perpendicularly inclined with respect to the circumference of the lens frame and being adapted to contact the contactors when the first lens is received in the lens frame to align the first lens with the lens frame upon rotation of the first lens relative to the lens frame.

3 Claims, 3 Drawing Sheets

LENS ALIGNMENT APPARATUS FOR USE IN A PROJECTION TELEVISION

FIELD OF THE INVENTION

The present invention relates to a lens alignment apparatus for use in a projection television by which a lens frame having mounted thereon a lens for projecting an image on the fluorescent screen of a projection tube onto a large-scale screen in the projection television can be mounted on the tube-mounting frame in such a way that the lens frame is in alignment with a first lens that is mounted in front of the fluorescent screen with a liquid coolant being placed between the fluorescent screen and the first lens.

BACKGROUND OF THE INVENTION

In conventional projection televisions, a projection tube is mounted on a frame having a window that opens to the front of the fluorescent screen of the tube. A packing is inserted between the peripheral edge of the window and the front face of the tube. A first lens is mounted in the window in the mounting frame with a packing inserted therebetween. A liquid coolant is contained between the first lens and the fluorescent screen of the projection tube. The mounting frame is also fitted with a lens frame in which is typically mounted at least one lens for projecting an image on the fluorescent screen onto a large-size screen.

When the first lens is mounted on the mounting frame, installation errors can cause misalignment between the centers of the window in the frame and the center of the first lens. Misalignment can also occur between the centers of the lens frame and the window when the manufacturer installs the lens frame on the mounting frame. The second alignment error compounds the first alignment error with the result that the center of the first lens becomes offset from that of the lens frame. This will cause the picture on the projection screen to lose sharpness.

To avoid this problem, it is necessary to attain alignment between the centers of the lens frame and the first lens. This alignment step must be done by the operator while he is looking at the picture on the screen to make sure that it is in focus. This not only requires great skill but also involves considerable difficulty.

SUMMARY OF THE INVENTION

An object of the present invention is to eliminate the problems with conventional projection televisions which occur on account of misalignment between the centers of the first lens and the lens frame.

Another object of the present invention is a lens alignment apparatus for use in a projection television to automatically align the centers of the first lens and the lens frame by merely rotating the lens frame after it has been brought into contact with the first lens.

These and other objects are accomplished by a lens alignment apparatus for use in a projection television having a fluorescent screen including a tube and a projection tube mounting frame comprises a first lens mounted on the projection tube mounting frame in front of the fluorescent screen of the tube, a lens frame for receiving the first lens, a plurality of contactors provided on one of the peripheries of the first lens and the lens frame, a plurality of guide members provided on the other of the peripheries of the first lens and the lens frame, the guide members being inclined with respect to a line tangent to the circumference of the lens and being adapted to contact the contactors when the first lens is received in the lens frame to align the first lens with the lens frame upon rotation of the first lens relative to the lens frame.

Incidentally, the lens alignment method achieved by the present invention is quite different from that for an ordinary photographic camera in which lens elements are to be held in a single lens barrel.

BRIEF DESCRIPTION OF THE DRAWINGS

The manner by which the above objects and other objects, features, and advantages of the present invention are attained will be fully apparent from the following detailed description when it is considered in view of the drawings, wherein.

DETAILED DESCRIPTION

Figure 1:
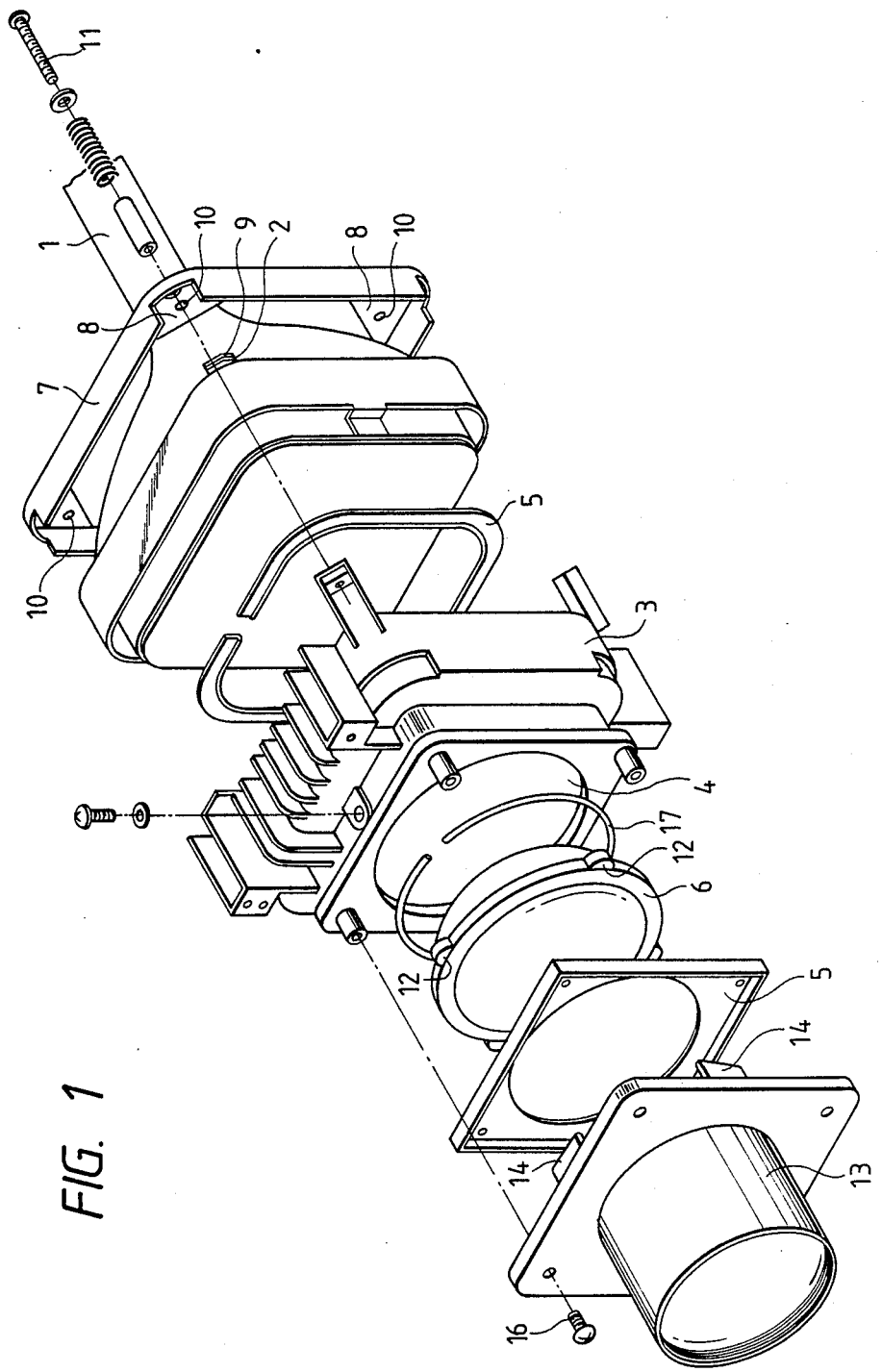
FIG. 1 is an exploded view of the lens alignment apparatus of the present invention.
Figure 2:
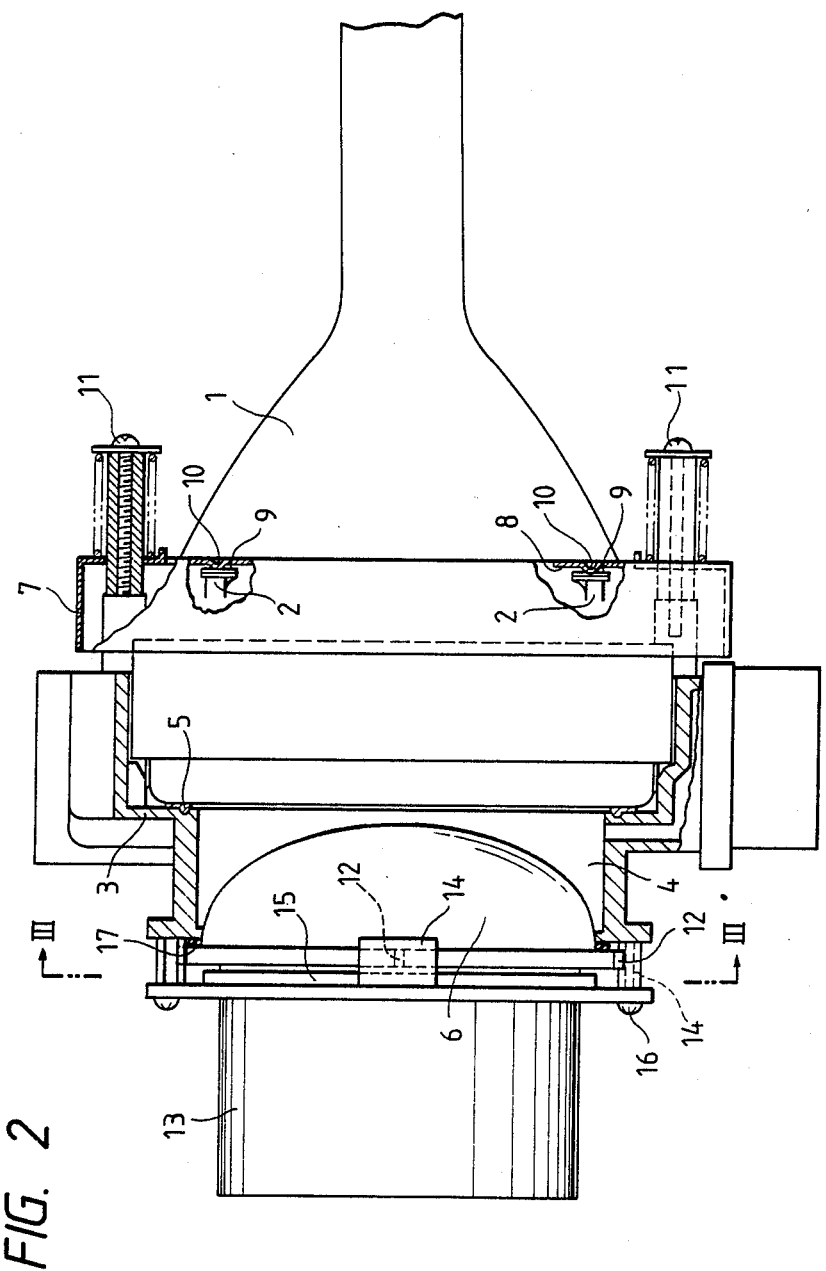
FIG. 2 is a longitudinal sectional view of the apparatus of FIG. 1 in the assembled state.
Figure 3:
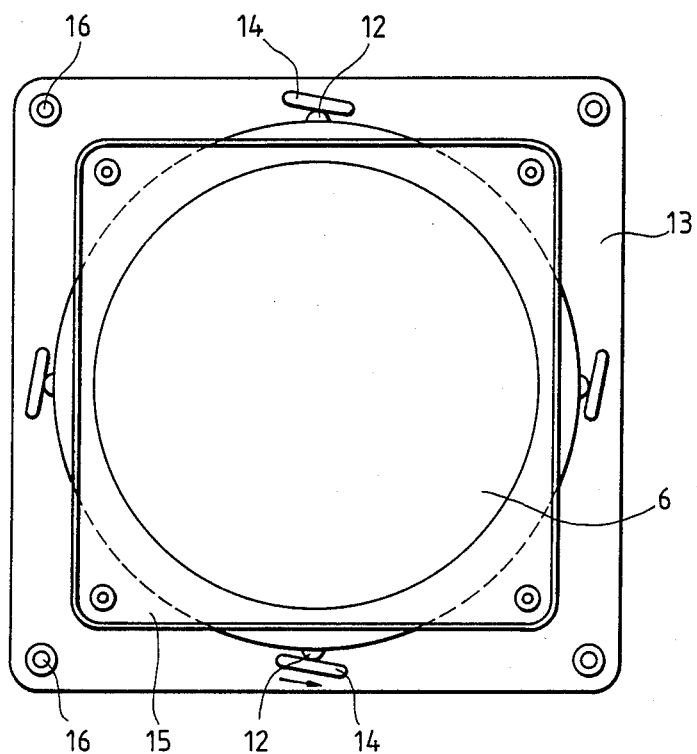
FIG. 3 is a cross-sectional view of the lens alignment apparatus according to FIG. 2 taken along the line III—III.

The apparatus of the present invention provides a plurality of guide members that are equidistant from the center and are inclined with respect to a tangent line. Contactors are also provided which are capable of coming in contact with the guide members. The guide members are provided either at the outer periphery of a first lens to be mounted in front of a projection tube or on the lens frame to be mounted in front of the first lens. The contactors are provided on the other elements. The first lens and the lens frame are brought into alignment by means of engagement between the guide members and the contactors.

A projection tube 1 has projecting pads 2 formed on the back side in areas that are close to its neck portion. A front frame 3 for mounting the tube 1 has a window 4 in the center of its front face through which an image on the tube 1 is projected onto a large-size screen. A packing 5 is attached to the periphery of the window 4 and is placed in contact with the periphery of the faceplate of the tube 1.

A lens 6 is mounted into the window 4 from the front side and a liquid coolant is contained between the lens 6 and the tube 1 to cool the tube. The coolant also serves as an integral part of the lens 6.

A rear frame 7 is fitted over the back side of the tube 1 from its rear side and has a face 8 that is in contact with the pads 2 on the tube 1.

Flat metal plates 9 are bonded to the pads 2 by a suitable means such as two-sided adhesive tape or other adhesives. When the rear frame 7 is fitted over the back side of the tube 1 from its rear side, small projections 10 on the frame 7 are brought into contact with the metal plates 9, and the rear frame 7 is then fastened to the front frame 3 by screws 11.

These procedures complete the process of installing the projection tube 1 on the mounting frame consisting of the front frame 3 and the rear frame 7.

Four projections 12 are formed in selected areas of the periphery of the lens 6 which are equidistant from the center of the lens 6. Four inclined guide members 14 are formed in selected areas of a lens frame 13 on the side that faces the periphery of the lens 6. The lens frame 13 is mounted in front of the lens 6 and typically contains at least one lens through which an image on the fluorescent screen of the tube 1 is projected on a large-scale screen.

The guide members 14 are formed concentrically with the center of the lens in the lens frame 13 and are equidistant from the center of the lens in the lens frame 13. The guide members 14 are perpendicularly inclined with respect to the circumference of the lens frame 13.

Because of this arrangement, if the lens frame 13 is rotated relative to the lens 6 with the guide members 14 being in contact with the projections 12, the guide members 14 are guided by the projections 12 to bring the center of the lens 6 into alignment with the center of lens frame 13 as well as the lens in the frame 13.

If the lens frame 13 is secured to the front frame 3 by means of screws 16, with both the lens 6 and a fixing plate 15 being held between them, the lens 6 and the lens frame 13 can be fixed without disturbing the aligned state. The fixing plate 15 is fitted with a filter to remove any color imbalance.

A packing 17 is inserted between the lens 6 and the front frame 3 to contain a liquid coolant. The fixing plate 15 is preliminarily secured to the back side of the lens frame 13 by a suitable means such as screws.

As described herein, the apparatus of the present invention has guide members provided on either one of the first lens and the lens frame and are rotated in contact with contactors provided on the other of the first lens and the lens frame to align the centers of the first lens and the lens frame. The precision of the alignment between the first lens and the lens frame is determined by the concentricity and can be maintained at a high level in the absence of any intervening members such as the mounting frame that would introduce an error in concentricity. As a further advantage, the alignment work can be performed by simply rotating the guide members relative to the contactors. This work does not require skilled operators or involve any difficulty and can be accomplished with great rapidity and accuracy.

What is claimed is:

1. A lens alignment apparatus for use in a projection television having a fluorescent screen including a tube and a projection tube mounting frame comprising:
    a first lens having a periphery adapted to be mounted on the projection tube mounting frame in front of the fluorescent screen of the tube;
    a lens frame having a periphery for receiving said first lens;
    a plurality of contactors provided on one of the peripheries of said first lens and said lens frame; and
    a plurality of guide members provided on the other of said peripheries of said first lens and said lens frame, said guide members being perpendicularly inclined from said lens frame with respect to the circumference of said lens frame and being adapted to contact said contactors when said first lens is received in said lens frame to align said first lens with said lens frame upon rotation of said first lens relative to said lens frame.

2. A lens alignment apparatus according to claim 1, wherein said guide members are provided at said periphery of said first lens and are equidistant from the center of said first lens and said contactors are provided on said lens frame.

3. A lens alignment apparatus according to claim 1, wherein said guide members are provided on said periphery of said lens frame and are equidistant from the center of said lens frame and said contactors are provided at the periphery of said first lens.

* * * * *